United States Patent
Gustafson et al.

(10) Patent No.: US 9,224,152 B2
(45) Date of Patent: Dec. 29, 2015

(54) SYSTEM AND METHOD FOR INTENT MINING

(75) Inventors: Steven Matt Gustafson, Niskayuna, NY (US); David Brian Bracewell, Niskayuna, NY (US)

(73) Assignee: NBCUNIVERSAL MEDIA, LLC, Wilmington, DE (US)

( * ) Notice: Subject to any disclaimer, the term of this patent is extended or adjusted under 35 U.S.C. 154(b) by 1360 days.

(21) Appl. No.: 12/638,254

(22) Filed: Dec. 15, 2009

(65) Prior Publication Data

US 2011/0145285 A1    Jun. 16, 2011

(51) Int. Cl.
   *G06F 17/30*      (2006.01)
   *G06Q 30/02*      (2012.01)

(52) U.S. Cl.
   CPC .......... *G06Q 30/02* (2013.01); *G06F 17/30572* (2013.01); *G06F 17/30705* (2013.01)

(58) Field of Classification Search
   CPC .................... G06F 17/30572; G06F 17/30705
   USPC ....................... 707/776, 777, 779; 706/45, 46
   See application file for complete search history.

(56) References Cited

U.S. PATENT DOCUMENTS

| | | | |
|---|---|---|---|
| 5,799,268 A | 8/1998 | Boguraev | |
| 6,002,997 A | 12/1999 | Tou | |
| 6,823,325 B1 * | 11/2004 | Davies et al. | 706/50 |
| 7,426,505 B2 | 9/2008 | Simpson et al. | |
| 7,539,619 B1 | 5/2009 | Seligman et al. | |
| 2003/0083863 A1 * | 5/2003 | Ringger et al. | 704/10 |
| 2010/0114899 A1 * | 5/2010 | Guha et al. | 707/741 |
| 2010/0306229 A1 * | 12/2010 | Timm et al. | 707/767 |

\* cited by examiner

*Primary Examiner* — Grace Park

(74) *Attorney, Agent, or Firm* — Fletcher Yoder, P.C.

(57) ABSTRACT

A method for intent mining is provided. The method includes performing a preliminary search of a constrained source using one or more seed phrases to generate multiple preliminary search results representing different ways of expressing a desired intent. The method also includes identifying each of the plurality of preliminary search results that have expressed the desired intent to generate a plurality of intent results. The method also includes producing multiple action search strings around one or more action verbs in each of the multiple intent results. The method further includes applying each of the multiple action search strings on one or more non-constrained sources to generate multiple action search results.

11 Claims, 5 Drawing Sheets

|  | CLASSIFIED AS HAVING INTENT | CLASSIFIED AS NOT HAVING INTENT | PRECISION |
|---|---|---|---|
| MANUALLY TAGGED AS HAVING INTENT | (TRUE POSITIVE) 41 | (FALSE NEGATIVE) 5 | 89% |
| MANUALLY TAGGED AS NOT HAVING INTENT | (FALSE POSITIVE) 8 | (TRUE NEGATIVE) 74 | 90% |
| RECALL | 84% | 94% | ACCURACY 90% |

FIG. 5

SYSTEM AND METHOD FOR INTENT MINING

BACKGROUND

The invention relates generally to text processing, and more particularly to sentiment-bearing text processing.

Web users contribute a significant amount of content such as user reviews for various products and services, which are commonly found on shopping sites, weblogs, forums, etc. Such review data reflect Web users' sentiment toward products and are very helpful for consumers, manufacturers, and retailers. Various types of classification of such reviews are performed to analyze such review data. A typical type of classification is sentiment classification, wherein reviews are categorized to represent the sentiments of the users. Another type of such classification is intent classification or intent mining.

Sentiment classification of online product reviews has been drawing an increase in attention. Typical sentiment categories include, for example, positive, negative, mixed, and none. "Mixed" implies that a review contains both positive and negative opinions. "None" implies that there are no user opinions conveyed in the user review. Sentiment classification can be applied to classifying product features, review sentences, an entire review document, or other writing.

On the other hand, intent mining is a document analysis wherein a willingness of an author to perform an action is analyzed. Intent mining analyzes grammatical patterns that express intent. However, the process of intent mining is complex due to multiple modes of expressing intent. Furthermore, vocabulary for expressing intent is not well-defined.

Hence, there is a need for an improved intent mining process to analyze Web user reviews.

BRIEF DESCRIPTION

In accordance with an embodiment of the invention, a method for intent mining is provided. The method includes performing a preliminary search of a constrained source using one or more seed phrases to generate a plurality of preliminary search results representing different ways of expressing a desired intent. The method also includes identifying each of the plurality of preliminary search results that have expressed the desired intent to generate a plurality of intent results. The method also includes producing multiple action search strings around one or more action verbs in each of the multiple intent results. The method further includes applying each of the multiple action search strings on one or more non-constrained sources to generate multiple action search results.

In accordance with another embodiment of the invention, a processing circuitry is provided. The processing circuitry is configured to perform a preliminary search of a constrained source using one or more seed phrases to generate multiple preliminary search results representing different ways of expressing a desired intent. The processing circuitry is also configured to identify each of the multiple preliminary search results that have expressed the desired intent to multiple intent results. The processing circuitry is further configured to produce multiple action search strings around one or more action verbs in each of the multiple intent results. The processing circuitry is also configured to apply each of the multiple action search strings on one or more non-constrained sources to generate multiple action search results.

DRAWINGS

These and other features, aspects, and advantages of the present invention will become better understood when the following detailed description is read with reference to the accompanying drawings in which like characters represent like parts throughout the drawings, wherein:

FIG. 5 is a tabular representation of an exemplary intent mining search performed to obtain a set of blog entries that express intent to see a particular movie.

DETAILED DESCRIPTION

As discussed in detail below, embodiments of the invention include a system and method for intent mining Intent mining is a sub-field of sentiment analysis wherein the analysis is based on whether an emotion drives an individual or a group expressing an opinion into performing a desired action. Such analysis provides added intelligence that may be a better predictor of results, such as, but not limited to, movie opening gross and sales. The system and method leverage a constrained source to build appropriate patterns of discussion that are used by the user of interest to express an opinion about a topic. The constrained source compels the user to be concise and clear. As used herein, the term 'constrained source' refers to a data source that limits text to a certain number of characters. Foundational patterns obtained from the constrained source are then generalized to be appropriate for a data source of interest.

Although not required, the systems and methods for performing a dynamic search with implicit intention mining are described in the general context of computer-executable instructions (program modules) being executed by a computer device such as a personal computer. Program modules generally include routines, programs, objects, components, data structures, etc., that perform particular tasks or implement particular abstract data types. While the systems and methods are described in the foregoing context, it will be understood that acts and operations described hereinafter may be implemented in any suitable hardware, software, firmware, or combination thereof.

Figure 1:
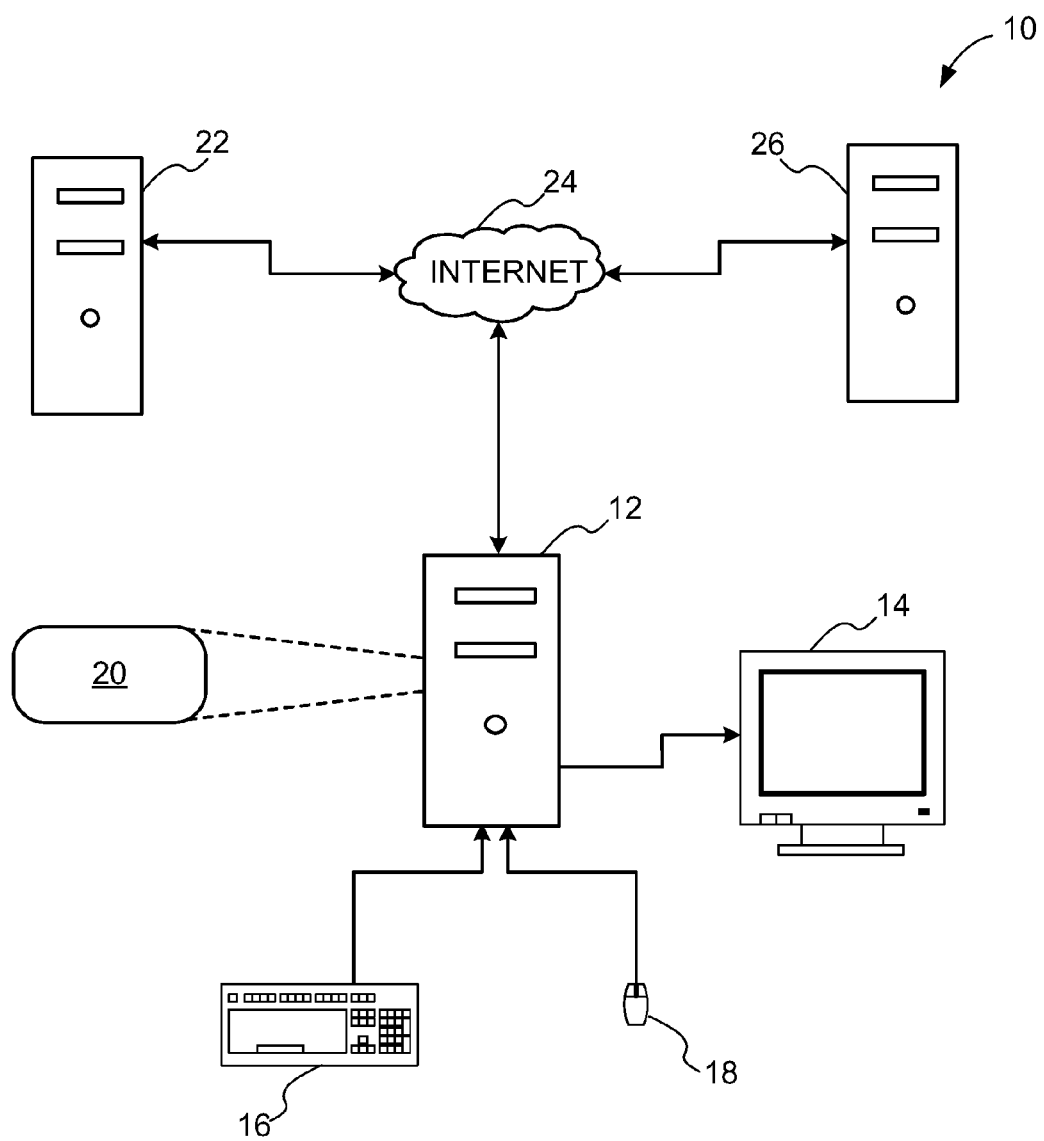
FIG. 1 is a schematic illustration of a system for performing intent mining in accordance with an embodiment of the invention.

FIG. 1 is a schematic illustration of a system 10 for performing intent mining, according to one embodiment. In one implementation, the system 10 includes a processor 12, such as a personal computer (PC), having conventional user interface components such as a graphics display or monitor 14, a keyboard 16, and a mouse or other pointing device 18. The processor 12 also includes an intent mining (IM) engine 20. As will be discussed in more detail below, the IM engine 20 may be used to analyze text and language once a topic of discussion is identified accurately to determine an intent of action of users.

In the example of FIG. 1, the processor 12 is a desktop computer. However, the processor 12 could alternately comprise a variety of other types of computer and computer-like devices, such as a notebook or portable computer, a tablet PC, a cell phone, a personal digital assistant (PDA), a workstation, a mainframe computer, a server, an Internet appliance, a set-top box, combinations thereof, and so on. Generally, a processor 12 will have various functionalities, allowing a user to perform a number of tasks. For example, processor 12 may be used to run a host of standard computer programs (word processing, spreadsheets, etc.) and games, send and receive emails and instant messages, browse the Internet, etc. A user typically interacts with processor 12 via one or more types of user input interfaces such as by moving an on-screen cursor with the mouse 18, and by typing at the keyboard 16. The user may also input commands or data to the processor 12 through use of a biometric input device, such as a microphone for the entry of voice commands, or any other biometric input device known in the art (not shown for the sake of graphic clarity). In this implementation, processor 12 is coupled directly to a network 24, such as the Internet, via any possible connection type known in the art, including telephone lines and ISDN lines. One or more other computers 22 and a server 26 may also be connected to the network 24. Similarly, computer(s) 22 and server 26 may share data and instructions with each other as well as with computer 12. In another implementation, computer 12 is connected directly to the computer(s) 22, and/or the server 26 without having to go through network 24.

As illustrated in FIG. 1, IM engine 12 may reside on a processor 14. It will be understood, however, that IM engine 20 may also reside on the processor(s) 22 and/or the server 26. Moreover, different portions of the IM engine 20 may reside on any of the computer 12, the computer(s) 22 and the server 26 at different times. For example, in one implementation, a user at computer 12 may perform a local desktop search by entering a search term for intent mining into computer 12 via keyboard 106. In this illustration, the IM engine 20 resides on the processor 12. In another embodiment, a user at processor 12 may enter a search term for a Web search into processor 12 via keyboard 16. The search term may be transmitted to the server 26 directly, or via the network 24, and the search may be refined by an instance of IM engine 20 residing on a different computer such as the server 26. Alternately, in yet another possible implementation, a search term for either a desktop or Web search may be entered into processor 12 and portions of the IM engine 20 from the processor 12, the computer(s) 22 and the server 26 may be used to refine the search. It will also be understood that desktop searches on the processor 12 may be refined by an instance of IM engine 20 on the computer(s) 22 or on the server 26. Similarly, a Web search may be refined by an instance of IM engine 20 on processor 12.

Figure 2:
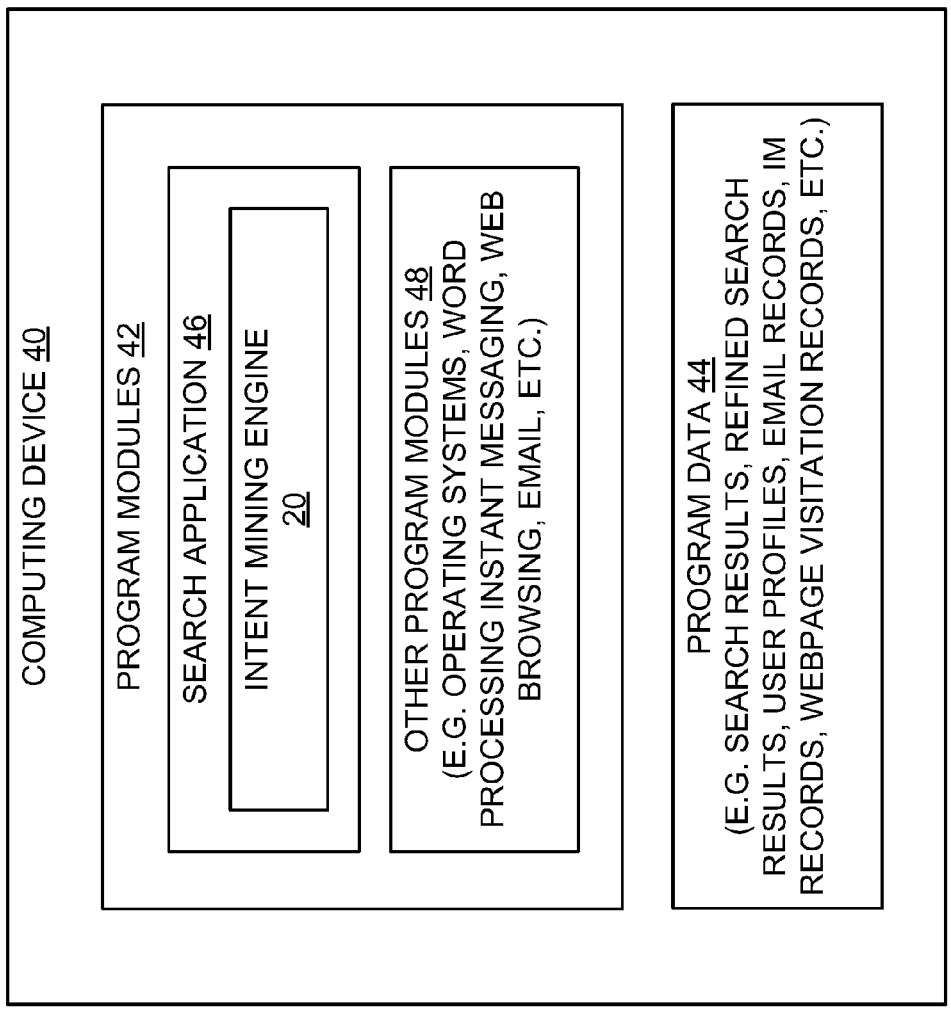
FIG. 2 is a schematic illustration of an exemplary computing device employed in the system of FIG. 1.

FIG. 2 illustrates an exemplary processing circuitry or computing device 40 to perform intent mining including program modules 42 and program data 44. Program modules 42 include a search application 46, which may include the IM engine 20. Program modules 42 may also include other program modules 48 such as, for example, an operating system, and one or more applications such as word processing, instant messaging, Web browsing, email, etc. Program data 44, may include various program data such as, original search data, refined search data, user profiles, email records, Instant messaging records, Website visitation records, etc.

Figure 3:
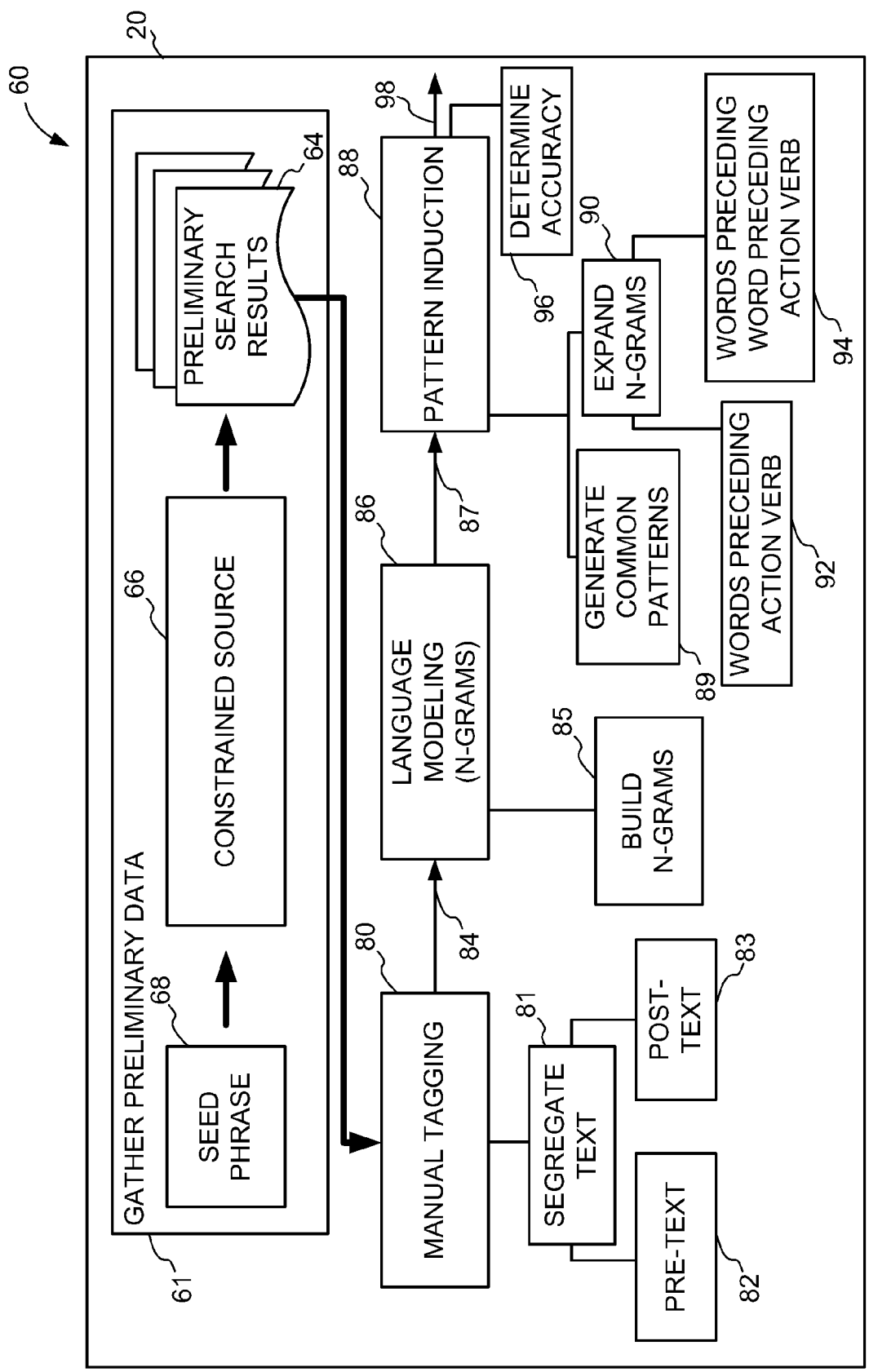
FIG. 3 is a block diagram representation of an algorithm employed in intent mining in accordance with an embodiment of the invention.

FIG. 3 is a block diagram representation of an algorithm 60 employed in the IM engine 20. The algorithm 60 includes steps of generating preliminary data represented by numeral 61, 'manual tagging' 80, 'language modeling' 86, and pattern creation/induction 88. Each of these steps further include sub-steps which are described below. Beginning with the step 61 of generating preliminary data, seed phrases 68 are input into a constrained source 66 to generate preliminary search results 64 that are phrases of text representing different ways of expressing a desired intent. The term 'constrained source' refers to online data sources that compel users to have a compact writing style. In an exemplary embodiment, the constrained source 66 includes tweets on Twitter.com. Seed phrases 68 typically include a pattern and an item. An exemplary phrase may be: "to see movie", wherein the phrase 'to see' refers to the pattern and 'movie' refers to the item. The preliminary search results 64 generated are further input into the 'manual tagging' process 80. In other words, the preliminary search results 64 are 'manually tagged', in step 80 as described below. The 'manual tagging process' includes a step 81 of segregating text in each of the preliminary search results 64 into two parts: a pre-text 82, appearing before the item of interest i.e. 'movie', in this example, and a post-text 83 appearing after the item of interest i.e. 'movie'. Consider an exemplary search result, such as, 'I want to see bruno on the weekend', wherein 'bruno' is a movie name. Accordingly, the pre-text includes 'I want to see' and the post-text includes 'on the weekend'. The pre-text 82 is examined and manually assigned as either expressing intent or not expressing intent.

The manually tagged data 84 is input into the 'language modeling' process and undergoes 'language modeling', as referenced by numeral 86. The manually tagged data 84 that expresses intent is initially filtered to remove text artifacts such as, but not limited to, html entities and quotes resulting in multiple intent results. The 'language modeling process 86 includes a step of 'building n-grams', referenced by numeral 85, wherein the filtered text in the search results expressing intent is used to build n-grams around main action verbs in the search result. The term 'n-grams' refers to (n-1) words to a left of a verb and the verb. In one embodiment, a tri-gram (n=3) is generated. In another embodiment, a quadgram (n=4) is generated. In an exemplary embodiment, a search result may have more than one action verb. In such a case, n-grams are built around each of the action verbs. In another embodiment, n-grams including negations are ignored. In continuation with the example mentioned above, an exemplary n-gram is 'really want to see'.

The n-grams generated 87 by the 'language modeling' process 86 are input into a 'pattern induction' process represented by reference numeral 88. The 'pattern induction' process 88 includes two sub-steps 89 and 90. As an initial step in the pattern induction 88, sub-step 89 includes generating common patterns among words directly preceding the action verb are obtained. In one embodiment, words preceding the action verbs are articles and infinitives that have common combinations when used with the action verb. In another embodiment, cultural variations of parts-of-speech lead to common combinations when used with the action verb. Exemplary phrases signifying similar combinations include 'want 2 see', 'want to see', 'want to go see', 'to go and see'. Exemplary generated patterns include '(to OR 2) see' and '(to) (go)? (and)? see', wherein the symbol '?' signifies the word in ( ) may or may not be present.

A next step 90 in pattern induction includes expanding the n-grams to generate different combinations. The expansion in step 90 is performed in a couple of further sub-divided steps, referenced by numerals 92 and 94. Specifically, a first step 92 includes expanding a word preceding the action verb, and a second step 94 includes expanding a word before the word preceding the action verb.

Referring back to the example, for better understanding of the further sub-divided two-step (92, 94) process, consider an n-gram 'want to see'. Other combinations of the word 'to' preceding the action verb 'see' are considered. Hence, in the first step, a combination of 'to' is formed as (to)?(go)?(and)? see. In the second step, as described above, other combinations of the word 'want', before the word 'to' preceding the action verb 'see' are considered. This results in 'hope to see', 'wish to see', and 'like to see'. Thus, the search string obtained from the first step includes "want (to)?(go)?(and) ?see". Similarly, the search string obtained from the second step includes (want|hope|wish|like) (to)?(go)?(and)?see.

Furthermore, the algorithm is tested for accuracy, as referenced by numeral 96. In such a process, accuracy of the search string obtained from step 94 is calculated in a 'closed test'. As used herein, the term 'closed test' refers to analysis wherein different patterns are compared at the same time to determine whether a generic or a more specific pattern should be included. An example of the generic pattern is: (to)?(go (and)?)? see. Similarly, an example of a specific pattern is: (want) (to)?(go (and)?)? see. In one embodiment, when the accuracy of the specific pattern is above a threshold value, the specific pattern is preferred over the generic pattern and included. In another embodiment, when the accuracy of the specific pattern is below the threshold value, the generic pattern is included, provided that accuracy of other specific patterns are also below the threshold value. The patterns included are referenced by numeral 98 and are added to a final set of patterned search strings.

Figure 4:
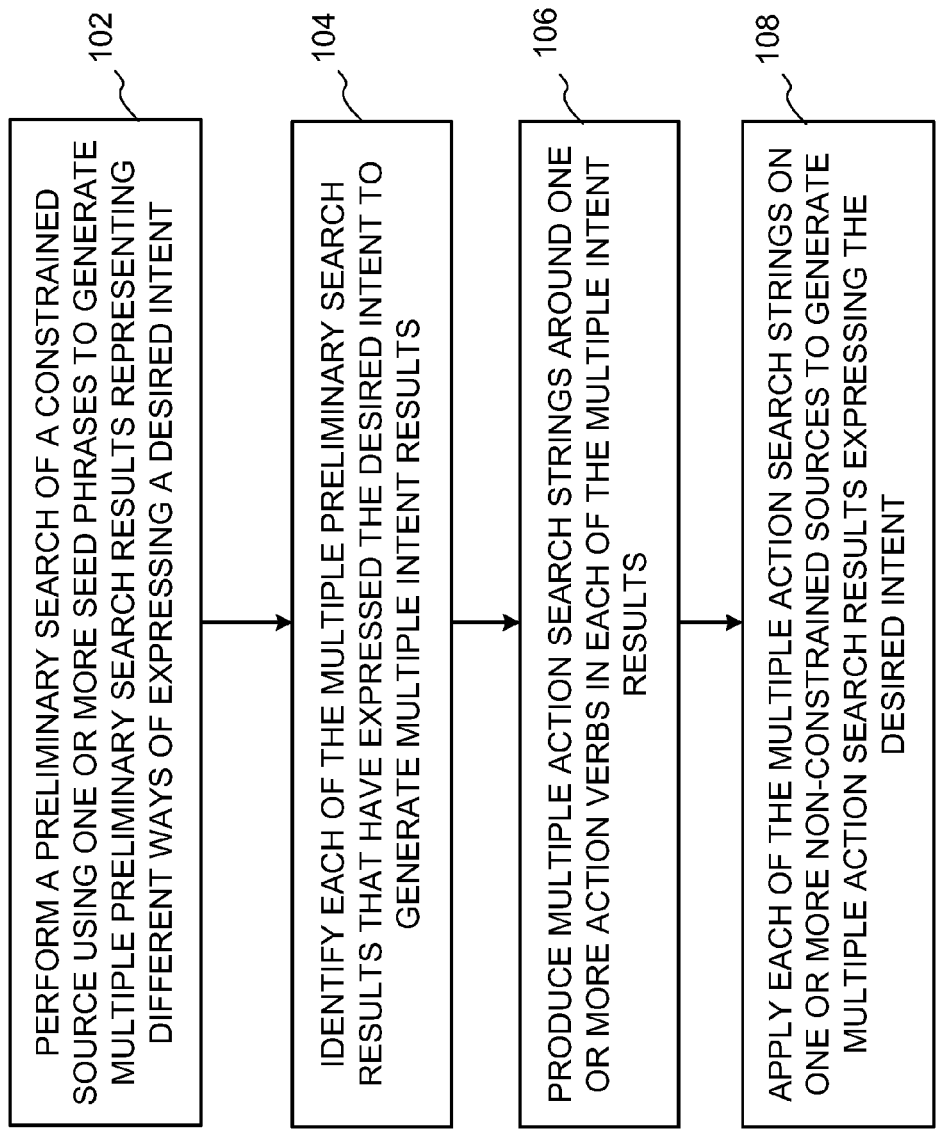
FIG. 4 is a flow chart representing steps in a method for intent mining in accordance with an embodiment of the invention.

FIG. 4 is a flow chart representing steps in a method for intent mining. The method includes performing a preliminary search of a constrained source using one or more seed phrases to generate a plurality of preliminary search results representing different ways of expressing a desired intent in step 102. In a particular embodiment, the preliminary search is performed on twitter.com or facebook.com. Each of the preliminary search results that have expressed the desired intent are identified to generate multiple intent results in step 104. In one embodiment, the preliminary search results are manually tagged. Multiple action search strings around one or more action verbs in each of the intent results are produced in step 106. In a particular embodiment, n-grams are built around one or more action verbs. A word directly preceding each of the one or more action verbs is expanded to form a first set of patterns. A second set of patterns is created from a word directly preceding the word preceding each of the one or more action verbs in each of the n-grams. Furthermore, the first set of patterns and the second set of patterns are combined. Each of the action strings are applied on one or more non-constrained sources to generate multiple action search results in step 108. In one embodiment, the multiple action search results are a list of phrases expressing intent. In another embodiment, the multiple action search results are a count of phrases expressing intent to perform the desired action. In yet another embodiment, the multiple action search results are a percentage of positive intent phrases among all phrases expressing intent. In a particular embodiment, the action search results are compared with the intent results to determine an accuracy factor, described with respect to the example below.

EXAMPLES

The example that follows is merely illustrative, and should not be construed as a limitation on the scope of the claimed invention.

FIG. 5 is a tabular representation 120 of an exemplary intent mining search performed to obtain a set of blog entries that express intent to see a movie 'Funny People'. A total of 129 unique phrases were manually tagged as either expressing or not expressing intent. The vertical columns 122 refer to automated classifications using the generated search strings from the process of FIG. 3 of phrases that have intent to watch the movie 'Funny People' (left column) and that do not have intent (right column). The horizontal rows 124 refer to classifications of phrases that are 'manually tagged' as having intent to watch the movie 'Funny people' (top row) or not (bottom row). Because we are determining the degree to which the generated search strings reproduce the 'manual tagging' performed by actual people, manually tagged results are considered true.

As illustrated herein, 41 phrases were manually tagged as having intent and classified as having intent. Such cases are referred to as 'true positive'. Similarly, 5 phrases were manually tagged as having intent and classified as not having intent, also referred to as 'false negative'. Furthermore, 8 phrases were manually tagged as not having intent and classified as having intent, also referred to as 'false positive'. Similarly, 74 phrases were manually tagged as not having intent and also classified as not having intent, also referred to as 'true negative'. A precision of 89% was obtained for phrases that were manually tagged as having intent, and a precision of 90% was obtained for phrases that were manually tagged as not having intent. An accuracy factor of 90% was determined based on the above analyzed data.

The various embodiments of a system and method for intent mining described above thus provide aggregating online discussion into a meaningful representation that drives business intelligence and real-time decisioning agents like advertising targeting software, alert systems, anti-piracy campaigns, and dynamic content generation. The intent mining technique also provides several commercial advantages in businesses varying from computer relationship management software to monitoring comments in social networks.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for intent mining comprising:
   performing, via an intent engine of computer processor, a preliminary search of a constrained source using one or more seed phrases to generate a plurality of preliminary search results representing different ways of expressing a desired intent, wherein the constrained source comprises at least one online data source that compels users of the constrained data source to have a compact writing style;

identifying, via the intent engine of the computer processor, each of the plurality of preliminary search results that have expressed the desired intent to generate a plurality of intent results;

producing, via the intent engine of the computer processor, a plurality of action search strings around one or more action verbs in each of the plurality of intent results; and applying, via the intent engine of the computer processor, each of the plurality of action search strings on one or more non-constrained sources to generate a plurality of electronic action search results for provision to at least one computer relationship manangement software system to monitor intent from the online data source.

2. The method of claim 1, wherein said performing the preliminary search comprises performing a preliminary search on on a data source that limits amount of text to a certain number of characters.

3. The method of claim 1, further comprising comparing the action search results with the intent results to determine an accuracy factor.

4. The method of claim 1, wherein said identifying comprises manually tagging each of the search results.

5. The method of claim 1, wherein said producing the plurality of action search strings further comprises:
   building a plurality of n-grams around one or more action verbs in each of the intent results;
   expanding a word directly preceding each of the one or more action verb in each of the n-grams to form a first set of patterns;
   creating a second set of patterns from a word directly preceding the word preceding each of the one or more action verbs in each of the n-grams; and
   combining the first set of patterns and the second set of patterns.

6. The method of claim 1, wherein said constrained source comprises a data source that enables users to have a compact writing style.

7. The method of claim 5, wherein said n-grams comprises a tri-gram and a quad-gram.

8. A processing circuitry configured to:
   perform, via an intent engine of processing circuitry, a preliminary search of a constrained source using one or more seed phrases to generate a plurality of preliminary search results representing different ways of expressing a desired intent, wherein the constrained source comprises at least one online data source that compels users of the constrained data source to have a compact writing style;
   identify, via the intent engine of the processing circuitry, each of the plurality of preliminary search results that have expressed the desired intent to generate a plurality of intent results;
   produce, via the intent engine of the processing circuitry, a plurality of action search strings around one or more action verbs in each of the plurality of intent results; and
   apply, via the intent engine of the processing circuitry, each of the plurality of action search strings on one or more non-constrained sources to generate a plurality of electronic action search results for provision to at least one computer relationship manangement software system to monitor intent from the online data source.

9. The processing circuitry of claim 8, wherein the processing circuitry configured to identify each of the plurality of preliminary search results and wherein the processing circuitry is configured to manually tag each of the search results.

10. The processing circuitry of claim 9, wherein the processing circuitry configured to produce action search strings comprises steps of:
   building a plurality of n-grams around one or more action verbs in each of the intent results;
   expanding a word directly preceding each of the one or more action verbs in each of the n-grams to form a first set of patterns;
   creating a second set of patterns from a word directly preceding the word preceding each of the one or more action verbs in each of the n-grams; and
   combining the first set of patterns and the second set of patterns.

11. The processing circuitry of claim 10, wherein said n-grams comprises a tri-gram and a quad-gram.

* * * * *